United States Patent [19]

Hardin

[11] Patent Number: 4,785,818
[45] Date of Patent: Nov. 22, 1988

[54] METHOD AND MEANS OR DYNAMICALLY WEIGHTED TEMPORAL AVERAGING OF PIXEL DATA

[75] Inventor: William R. Hardin, Folsom, Calif.

[73] Assignee: General Electric Company, Milwaukee, Wis.

[21] Appl. No.: 880,572

[22] Filed: Jun. 30, 1986

[51] Int. Cl.$^4$ ............................................. A61B 10/00
[52] U.S. Cl. .................................. 128/660.07; 358/112
[58] Field of Search .................... 128/653, 660, 661; 367/11; 358/111, 112, 166–167; 364/414, 724; 382/6, 41, 50–52, 54, 56; 73/602, 620, 625–626

[56] References Cited

U.S. PATENT DOCUMENTS

| | | | |
|---|---|---|---|
| 4,064,530 | 12/1977 | Kaiser et al. | 364/724 X |
| 4,367,490 | 1/1983 | Riederer | 358/111 X |
| 4,375,671 | 1/1983 | Engle | 364/414 X |
| 4,394,684 | 7/1983 | Verhoeven | 358/111 |
| 4,636,850 | 1/1987 | Stewart | 358/111 |

OTHER PUBLICATIONS

Ophir, J. et al, "DSC's in Diagnostic Ultrasound Imgaging", Proc. of the IEEE, vol. 67, No. 4 (Apr. 1979), pp. 654–664.
Ostro, P. T. et al, "Digital UTS Imaging with uP Manipulation" JMET, vol. 2, No. 5, Sept. 1978, pp. 234–238.

*Primary Examiner*—Francis J. Jaworski
*Attorney, Agent, or Firm*—Flehr, Hohbach, Test, Albritton & Herbert

[57] ABSTRACT

Pixel data stored in a display memory of an ultrasonic scanning system is updated in response to weighted new pixel data generated from a reflected ultrasonic wave averaged with weighted stored pixel data. A measure of difference between the new pixel data and the stored pixel data is obtained, and the weighting factor for the new pixel data increases as a function of the difference while the weighting factor for the stored data decreases as a function of the difference whereby small differences in the signals due to noise are suppressed while large differences in the pixel values due to fast moving echogenic targets such as a heart valve are enhanced. The weighting of the two pixel values can further include a factor depending on the selected display dynamic range of the ultrasonic scanner. The weighted values of the pixels are stored in memories that are addressed by the pixel value and the measure of difference between the present intensity value and the stored intensity value, and the outputs of the memories are then combined such as by averaging to obtain an updated pixel value for storage in the image memory.

11 Claims, 3 Drawing Sheets

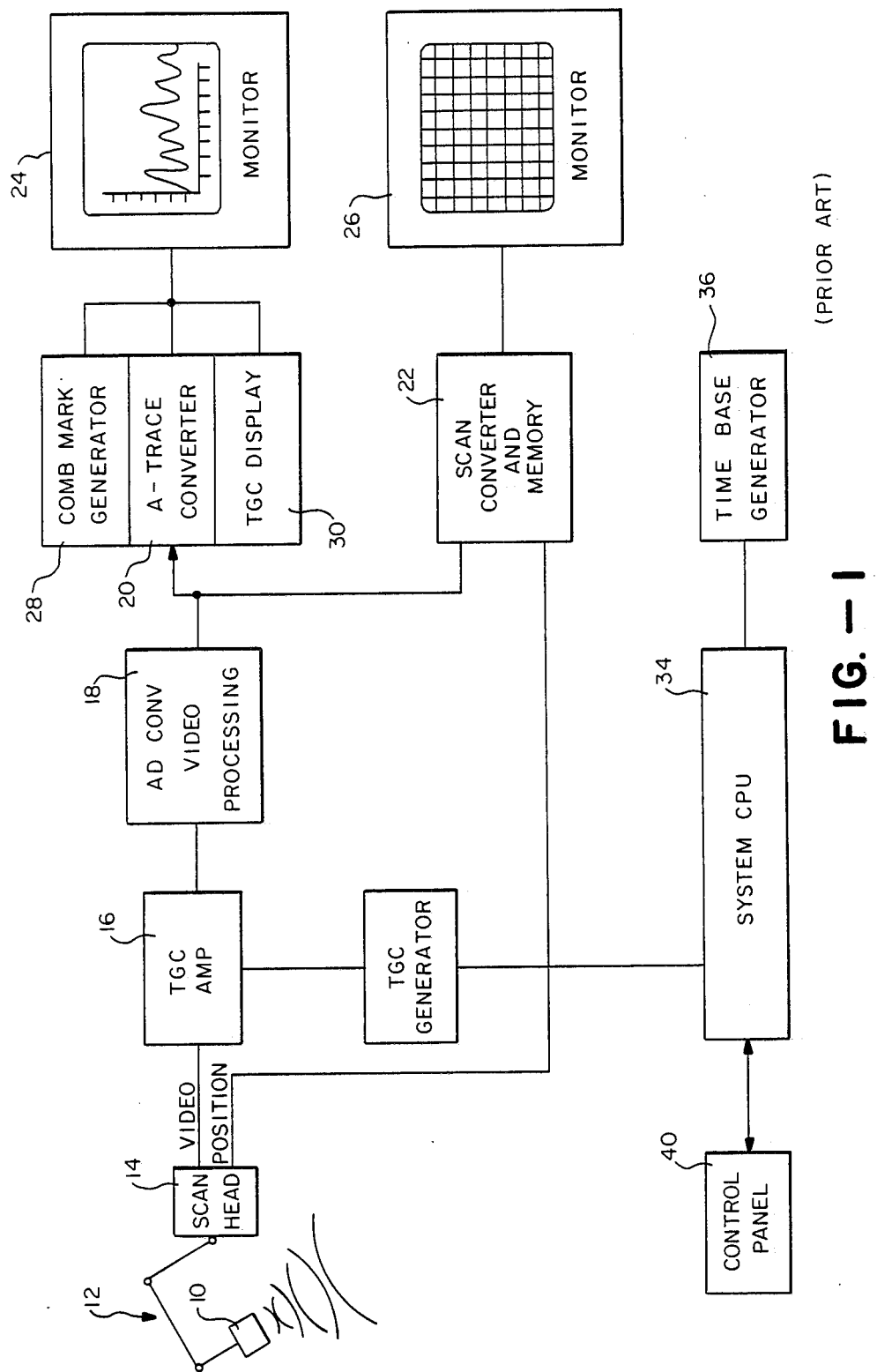
FIG.—1 (PRIOR ART)

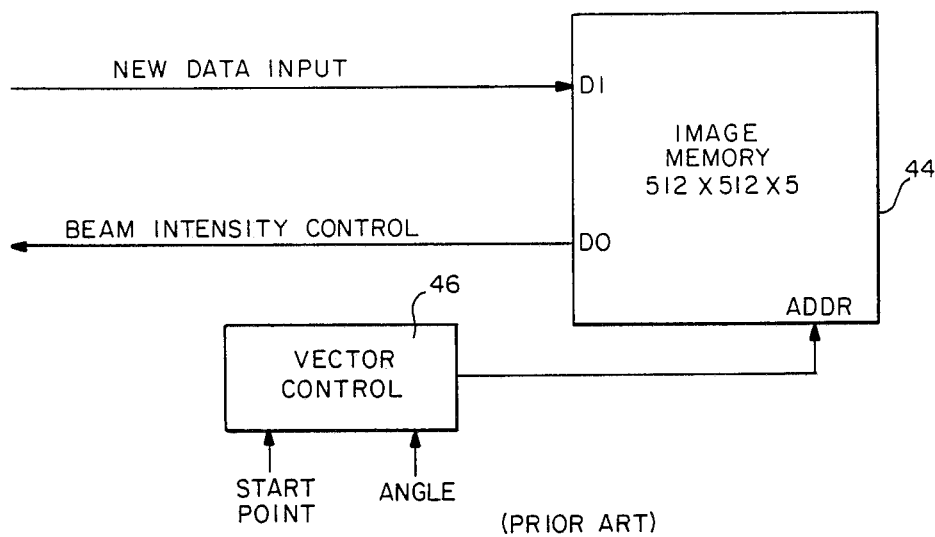
FIG.—2 (PRIOR ART)
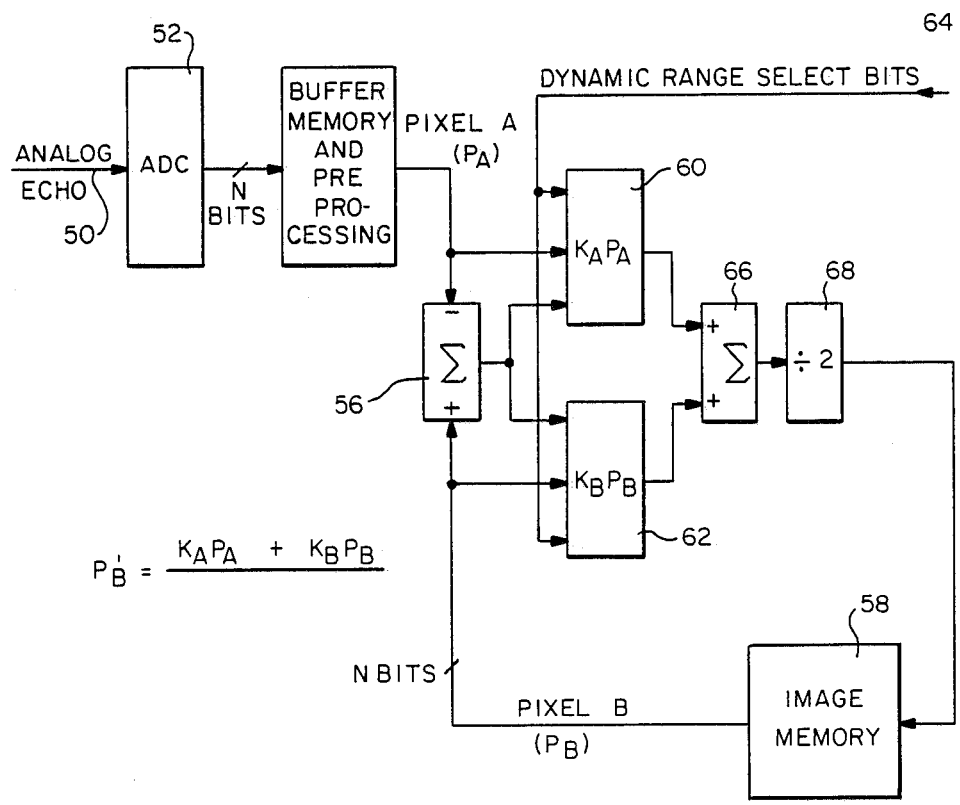
$$P'_B = \frac{K_A P_A + K_B P_B}{2}$$
FIG.—3

METHOD AND MEANS OR DYNAMICALLY WEIGHTED TEMPORAL AVERAGING OF PIXEL DATA

BACKGROUND OF THE INVENTION

This invention relates generally to ultrasonic scanners such as used for medical diagnostic purposes, and more particularly the invention relates to a method and means for providing improved picture display quality with dynamic weighting of pixel data in such a system.

Ultrasonic diagnostic systems are known and commercially available for diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display. The General Electric PASS and PASS II are real time imaging systems which use phased arrays of transducer elements.

Briefly, sush systems utilize sound transducer arrays to transmit ultrasonic (e.g. on the order of several megahertz) waves into a patient and to receive echo signals. The echo signals are applied to a time delaying focus circuit (element to element) with subsequent signal summation and logarithmic compresion and envelope detection before application to time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows ad vertical columns with each pixel having a brightness level in response to the input signal. Conventionally, the brightness is defined by a $2^n$ level Gray-scale, hence the pixel brightness level requires an n bit digital code. The pixel brightness codes are stored in a random access memory with the memory periodically updated in response to video signals produced from the ultrasonic scanner.

In order to improve the signal to noise ratio of the displayed image, some weighted combination of old pixel data and new pixel data is commonly employed. With less random noise in theimage, echogenic targets of interest are better defined and therefore more clinically useful for diagnostic purposes.

Frame to frame video averaging is a common algorithm used to reduce the content or severity of random noise in the echo generated image in order to improve the perceived signal to noise ratio. Frame to frame video averaging, or temporal averaging, is a method by which the current displayed video data point (pixel) is combined with newly collected echo pixel value. The resultant pixel of that combination will be the next one displayed at that location.

The algorithm typically used is a fixed linear weighting average of those two pixels. For example, U.S. Pat. No. 4,375,671 for "Method and Means for Filtering and Updating Pixel Data" discloses the updating of pixel data by combining stored pixel data and data from the latest scan. Briefly, pixel data to be displayed is stored in a first random access memory. A second random access memory stores values of pixel data for updating the first memory. The second memory is addressed by using the present intensity value for a pixel and the intensity value for the pixel as stored in the first memory. The corresponding intensity value stored in the second memory is then used to update the first memory for the pixel.

A limitation in known pixel averaging techniques is the suppression of large or fast pixel grey level changes of short duration such as in imaging a valve in the heart. The excessive weighting of the currently displayed pixel data versus the new incoming pixel data introduces a hysteresis or persistence effect to moving targets in the two dimensional image. This persistence appears as a smearing or blurring of moving tissue as presented in the image display which is just as undesirable as the noise which the averaging algorithm is intended to suppress. This is particularly troublesome in cardiac imaging and diagnostic applications.

Accordingly, an object of the present invention is an improved method of updating pixel data without adversely affecting the imaging of moving tissue.

Another object of the invention is apparatus useful in the updating of moving tissue pixel data in cardiac diagnostic applications while suppressing random noise.

A feature of the invention is the dynamic weighting of new pixel data based on the differential between the new data and the stored pixel data.

The invention is based on the theory that the relative change in pixel amplitude, or contrast ratio, is proportional to target velocity or motion. The larger the change in pixel amplitude or Gray level, the faster the object being imaged is assumed to be moving. As the differential between new pixel data and old pixel data increases, the weighting of the new pixel data increases. Accordingly, fast moving targets will appear without persistence yet random noise at lower amplitudes will tend to be suppressed.

In a preferred embodiment of the invention the difference between incoming pixel data and stored pixel data is employed in a weighting factor for weighting the new pixel data and the stored pixel data in suitable lookup tables. The differential in pixel amplitudes along with the old and new pixel values are used to address lookup tables for dynamically weighted values for the new and old pixel values, and the dynamically weighted values are then combined to provide a new pixel value. A third address based upon the display dynamic range acts to normalize the effect of the selected dynamic range on pixel contrast ratio. Display dynamic range is the echo voltage range that will be mapped over the full range of digital pixel values by the ADC, and therefore relates to pixel contrast ratio.

The invention and objects and features thereof will be more readily apparent from the following detailed description and appended claims when taken with the drawing.

BRIEF DESCRIPTION OF THE DRAWING

FIG. 1 is a function block diagram of an ultrasonic scanner system.

FIG. 2 is a functional block diagram of the image memory portion of the system of FIG. 1.

FIG. 3 is a functional block diagram of an image memory with dynamic weighting circuitry in accordance with one embodiment of the invention.

DETAILED DESCRIPTION OF THE ILLUSTRATED EMBODIMENT

Figure 4:
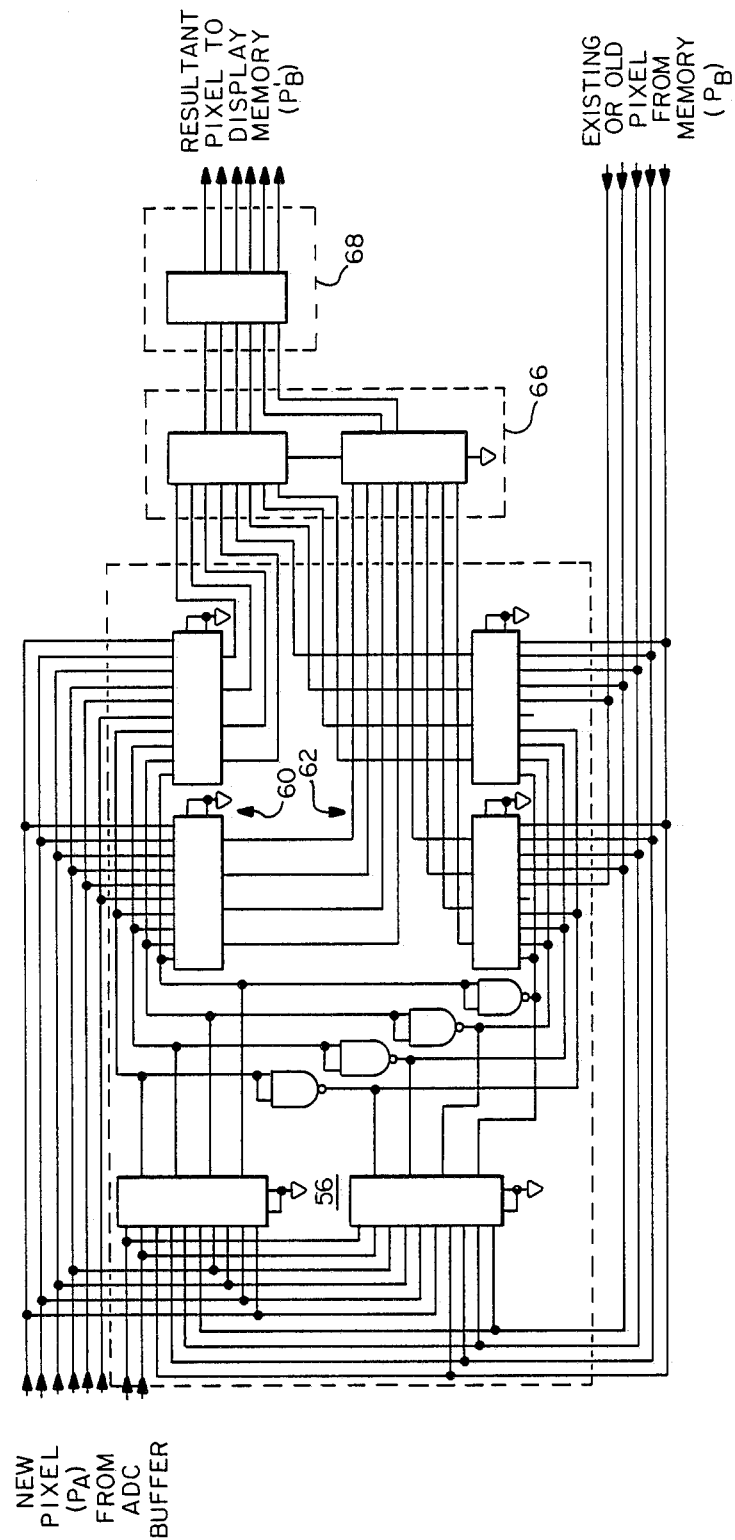
FIG. 4 is a more detailed schematic of dynamic weighting circuitry in accordance with one embodiment of the invention.

Referring now to the drawings, FIG. 1 is a functional block diagram of a Datason ultrasonic scanner. The system includes transducer 10 mounted on a hinged arm system shown generally at 12 whereby transducer 10 can move freely in a single plane. Scanner 10 transmits ultrasonic signals (e.g. on the order of 5 megahertz) and generates electrical signals in response to reflections of transmitted ultrasonic signals. The generated signals are attenuated in time due to attenuation of the ultrasonic signals passing through a patient.

The attenuated video signal is then applied to time gain compensated amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each X position. This data controls the intensity of the electron beam in the display during raster scanning of the beam. Scale markings for the displayed A trace are generated by Comb mark generator 28, and a time gain compensation curve is provided by generator 30.

A section view of the patient is displayed on monitor 26 in response to the scan converter and memory 22. The signal from circuitry 18 is converted for storage in a 512 by 512 memory matrix with each point of the matrix accommodating a 5 bit brightness code. The matrix corresponds to the pixels on the display of monitor 26 with the brightness code being indicative of the Gray-scale for the pixels.

System control is provided by central processing unit 34 which also drives the time base generator 36 which generates the timing signals for the system. A time gain compensation (TGC) control generator 38 generates the control signal for amplifier 16 and a control panel 40 is provided for manual control of the system for the central processing unit.

In the GE PASS and PASS II real time ultrasound imaging systems phases transducer arrays are employed. See for example U.S. Pat. No. 4,155,258. Signals from the transducer array are time delay focused and summed, logarithmically amplified, envelope detected, time gain compensated, and then converted from analog to digital form.

FIG. 2 is a function block diagram of the image memory portion of the scan converter and memory 22 of FIG. 1. As above indicated, the image memory 44 is a random access memory having storage locations corresponding to the pixels of the display of monitor 26. In the Datason system for example, the display comprises an array of pixels corresponding to 512 X positions and 512 Y position, and the signal intensity for each pixel is defined by 5 bit code. Consequently, memory 44 has 512 X addresses, 512 Y addresses, with each X and Y location accommodating 5 bits of data.

As an ultrasonic beam is transmitted through a patient, the scan converter 22 generates a vector including a plurality of addressable pixels. These pixel addresses are used to address and update memory 44 with the data at the address read out from beam intensity control in the monitor. As data for a pixel is read out of memory 44, the new data can be provided to the memory to update the pixel.

U.S. Pat. No. 4,375,671 discloses circuitry for combining the values of new pixel data and old pixel data through use of a lookup table to obtain image memory data based on a combination of the new and old data. This technique improves the signal to noise ratio of the new pixel data by diminishing the effect of noise on the new pixel data. However, as noted above, the resultant persistence of the image appears as a smearing or blurring of moving tissue as presented in the image display which adversely affects cardiac diagnostic imaging.

FIG. 3 is a functional block diagram of circuitry in accordance with the invention in which the pixel data is dynamically weighted prior to averaging depending upon the difference between the old pixel and the new pixel data whereby new pixel data is increasingly weighted as the difference between old and new the pixel data increases. As shown in the circuitry of FIG. 3, the analog echo signal at 50 is applied to analog to digital converter circuitry 52, and the output digital data is then applied to a buffer memory and preprocessing circuitry 54. Data for each new pixel, such as pixel A ($P_A$), is then applied to differencer circuitry 56. The other input to the differencer circuitry 56 is obtained from image memory 58 and denoted pixel B ($P_B$) data. The $P_A$ and $P_B$ values along with the difference from circuitry 56 are applied as addresses to two lookup tables 60 and 62 but are not essential to the invention. In addition, dynamic range selection bits from 64 can be applied as a third address to the lookup table 60 and 62 as shown in FIG. 3, but dynamic range selection is not necessary and is not employed in the schematic of FIG. 4. The output of the tables 60 and 62 are weighted values for $P_A$ and $P_B$ with the respective weighting constants, $K_A$ and $K_B$, varying with the difference between $P_A$ and $P_B$ and in conjunction with the dynamic range selection bits. The two weighted values of $K_A P_A$ and $K_B P_B$ are then summed at 66 and the resultant is halved at 68 to obtain an averaged value, $P_B'$, which is used to update the image memory 58.

Importantly, the value of $K_A$ can increase with increasing difference between $P_A$ and $P_B$ while $K_B$ can decrease with an increase in the different between $P_A$ and $P_B$. Thus, the value of the incoming date, $P_A$, becomes increasingly important for moving tissue in which the differences in pixel value can be large. Further, the direction of change of $P_A$ with respect to $P_B$ can be determined by the differencer and affect the averaging weighting assignments differently for the case of $P_A$ greater than $P_B$ versus $P_A$ less than $P_B$. The weighting functions may be linear or non-linear.

FIG. 4 is a detailed schematic of one embodiment of the invention in which dynamic range select bits are not employed. Like elements in FIG. 3 and FIG. 4 have the same reference numerals. The components utilized in the circuitry are as follows:

| | |
|---|---|
| Differencer 56 | 93453 Bipolar Proms |
| Weighting Tables 60, 62 | 93453 Bipolar Proms |
| Summer 66 | 74283 TTL Adders |
| Divider 68 | 74373 TTL Latch |

The dynamically weighted averaging of pixel data in accordance with the present invention has proved to be particularly advantageous in cardiac diagnostic applications. The method and apparatus are particularly useful in all applications where fast-moving tissue is to be imaged while retaining optimal control over the signal to noise ratio. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasonic scanner system in which video scanned data is defined for a plurality of addressable pixels in an electron beam display, a method of selectively updating stored pixel intensity data in response to repetitive ultrasonic beam scans whereby moving tissue imaging is enhanced while suppressing random noise comprising the steps of storing pixel data to be displayed in a first memory, storing first weighted values of pixel intensity data in a second memory and second weighted values of pixel intensity data in a third memory, establishing a present intensity value for a pixel in response to an acoustic beam scan, obtaining from said first memory a stored intensity value for said pixel, obtaining a measure of the difference between said present intensity value and said stored intensity value, addressing said second memory using said present intensity value and said measure of difference as a memory address, addressing said third memory using said stored intensity value and said measure of difference as a memory address, and updating said first memory using addressed values from said second memory and said third memory.

2. The method as defined by claim 1 wherein said step of updating said first memory by combining addressed values from said second memory and said third memory includes averaging said addressed values.

3. The method as defined by claim 1 and further including the steps of providing a weighting correction factor based on a selected display dynamic range echo mapping values, and including in the addressing of said second and third memories said weighting correction factor.

4. The method as defined by claim 1 and wherein the step of updating said first memory by combining addressed values from said second memory and said third memory includes averaging said addressed values.

5. The method as defined by claim 1 wherein the weighted values in said second memory increase as a function of said measure of difference and the weighted values in said third memory decrease as a function of said measure of difference.

6. In an ultrasonic scanner system in which video scanned data is defined for a plurality of addressable pixels in an electron beam display, a method of selectively updating stored pixel intensity data in response to an ultrasonic beam scan comprising the steps of obtaining a present intensity value for a pixel in response to an acoustic beam scan, obtaining a stored intensity value for said pixel from memory, weighting said present intensity value and said stored intensity value as a function of the difference therebetween whereby the present intensity value weighting increases as a function of said measured difference and the stored intensity value weighting decreases as a function of said difference, and combining the weighted present intensity value and the weighted stored intensity value by averaging said values to obtain an updated pixel value.

7. The method as defined by claim 6 wherein said step of weighting further includes a weighting factor based on the selected display dynamic range of the ultrasonic scanner system.

8. In an ultrasonic scanner system in which ultrasonic beam scan intensity data is defined for a plurality of addressable pixels in an electron beam display, apparatus for updating stored pixel data in response to repetitive ultrasonic beam scan comprising a first memory for storing pixel intensity data to be display, a second memory for storing first weighted values of pixel intensity data, a third memory for storing second weighted values of pixel intensity data, means for receiving a present intensity value for a pixel in response to an acoustic beam scan and a stored intensity value for said pixel and obtaining a measure of difference therebetween, said second memory being addressable by said present intensity value and said measure of difference, said said third memory being addressable by said stored intensity value and said measure of difference, and means for averaging addressed pixel intensity values from said second and third memories for obtaining an updated pixel value.

9. Apparatus for obtaining stored pixel data as defined by claim 8 wherein said second and third memories are further addressable by a dynamic range weighting correction factor based on the selected display dynamic range of the ultrasonic scanner system.

10. Apparatus as defined by claim 8 wherein the weighting factor of data in said second memory increases as a function of said measure of difference, and said weighting factor for data in said third memory decreases as a function of the difference in said measure of difference.

11. Apparatus as defined by claim 10 wherein said means for combining pixel values from said second and third memories comprises means for obtaining an average of the two pixel values.

* * * * *